United States Patent [19]

Kuriyama

[11] Patent Number: 4,907,873
[45] Date of Patent: Mar. 13, 1990

[54] MAGNIFIED IMAGE PROJECTOR APPARATUS

[75] Inventor: Masaaki Kuriyama, Osaka, Japan

[73] Assignee: Minolta Camera Kabushiki Kaisha, Osaka, Japan

[21] Appl. No.: 205,282

[22] Filed: Jun. 10, 1988

[30] Foreign Application Priority Data

Jun. 19, 1987 [JP] Japan ................................ 62-153047

[51] Int. Cl.$^4$ .......................... G03B 3/00; G03B 21/14
[52] U.S. Cl. ...................................... 353/101; 352/140
[58] Field of Search .................... 353/101, 98; 355/55, 355/56, 57, 60; 352/140; 354/402, 405

[56] References Cited

U.S. PATENT DOCUMENTS

| 3,191,491 | 6/1965 | Pignone | 353/101 X |
| 3,450,883 | 6/1969 | Thomas | 353/101 X |
| 3,622,797 | 11/1971 | Bragg | 353/101 X |
| 3,856,392 | 12/1974 | Harrison | 353/101 |

*Primary Examiner*—Harry N. Haroian
*Attorney, Agent, or Firm*—Burns, Doane, Swecker & Mathis

[57] ABSTRACT

A magnified image projector apparatus such as a microfilm strip reader or a microfilm strip printer apparatus having an automatic focus control system and a tiltable reflector mirror by means of which the image-carrying beam passed through an image projection lens may be directed to advance along one path of light toward the viewing screen to along another path of light to a photodetector unit of the focus control system which comprises a focusing lens located in the path of light between the tiltable reflector mirror and the photodetector unit so that the image-carrying beam passed through the projection lens may be incident on the photodetector unit to a reduced scale. This arrangement of the focussing lens allows significant reduction in the effective light receiving area of the photodetector unit used in the apparatus while enabling the photodetector unit to accurately detect the location at which the beam is focussed by the projection lens.

9 Claims, 10 Drawing Sheets

MAGNIFIED IMAGE PROJECTOR APPARATUS

FIELD OF THE INVENTION

The present invention relates to a magnified image projector apparatus such as a microfilm strip reader or a microfilm strip printer apparatus having an automatic focus control system.

BACKGROUND OF THE INVENTION

In a magnified image projector apparatus such as a microfilm strip reader, printer or combination reader/printer apparatus, the image to be reproduced on the viewing screen is correctly focussed with the projection lens moved with respect to the viewing screen through manipulative efforts of the operator, or viewer, who drives the lens directly or handles the mechanical lens position control means provided in the apparatus. A magnified image projector apparatus having such a manually operated focus control arrangement is now being superseded by a microfilm strip reader, printer or combination reader/printer apparatus equipped with an automatic focus control system. In the magnified image projector apparatus having such an automatic focus control system, the location of the plane on which a beam of light is focussed by the projection lens is detected by means of a photodetector unit which is responsive directly to the magnified image reproduced on the viewing screen of the apparatus.

A problem is encountered in a magnified image projector apparatus having such a known automatic focus control system in that the photodetector unit to be used is required to have a disproportionately spacious light receiving area in order that the photodetector unit be capable of coping with the blank areas which frequently appear in the image frames of a microfilm strip or the margin areas between the successive image frames of the microfilm strip. When the image reproduced on the viewing screen of the apparatus has a blank area which is wide compared to the effective light receiving area of the photodetector unit, it may happen that the photodetector unit can not detect or accurately detect the location of the plane o which the beam of light is focussed by the projection lens.

In a still or television camera having a reduced image projection system, there is provided a path of light to be used for the detection of the plane on which the beam of light is focussed, in addition to the path of light along which an information-carrying beam of light is to be directed through the reduced image projection system. The path of light to be used for the detection of the plane on which the beam of light is focussed may be created with an additional focusing lens located behind a focal plane of the object lens. The optical arrangement of this nature however has a drawback in that incorporation of such optical arrangement into the reduced image projection system results in an increase in the distance of the path of light from the projection lens to the photodetector unit. Another problem using the optical arrangement is that not only the scale but also the movement of an original image are magnified in the magnified image projection system so that the image to be focussed by the projection lens might enter the focal plane of the additional focussing lens and could not produce an reproduced image o the photodetector unit.

The path of light to be used for the detection of the location at which the beam of light is focussed may be created with a half mirror disposed between the front and rear lens groups of the object lens system. An additional focusing lens is located in one of the two components into which the beam of light to be photographed is split by the half mirror. This type of optical arrangement makes it difficult to exchange the lens system with another one.

SUMMARY OF THE INVENTION

The present invention contemplates elimination of these drawback of prior-art magnified image projector apparatus through provision of an additional focusing lens located in the path of light to the photodetector unit so that the image-carrying beam is incident on the photodetector unit to a reduced scale. This arrangement allows significant reduction in the effective light receiving area of the photodetector unit used in the apparatus while enabling the photodetector unit to accurately detect the location at which the beam is focussed by the projection lens.

In accordance with the present invention, there is provided a magnified image projector apparatus comprising (a) means for retaining in a predetermined position an image record medium having an image recorded thereon, (b) means for producing an information-carrying beam of light carrying information representative of the image on the image record medium, (c) a surface onto which the information-carrying beam is to be projected for display, the surface being fixed with respect to the predetermined position, (d) a first lens for projecting the information-carrying beam along a first path of light onto the surface with the image reproduced to a magnified scale on the surface, the first lens being movable along the first path of light with respect to the image record medium in the predetermined position and to the surface, (e) beam re-directing means located in the first path of light and operative to re-direct the information-carrying beam into a second path of light deflected from and shorter than the first path of light, (f) focussed state detecting means located in the second path of light and operative to detect the location at which the information-carrying beam passed through the first lens and re-directed to travel along the second path of light is to be focussed by the first lens, the detecting means being further operative to produce a focus signal having a state dependent on the location, (g) a second lens located in the second path of light between the beam re-directing means and the detecting means for projecting the information-carrying beam onto the detecting means with the image reduced in scale, and (h) adjusting means operatively connected to the first lens and responsive to the signal from the detecting means for driving the first lens for movement with respect to each of the image record medium in the predetermined position, the surface and the second lens in a direction substantially parallel with the first path of light.

In accordance with another outstanding aspect of the present invention, there is provided an image projector apparatus for magnifying a visible image recorded on an image record medium and projecting the magnified visible image on a projection plane, comprising (a) means for producing an information-carrying beam of light carrying information representative of the image on the image record medium, (b) a projection lens for projecting the information-carrying beam along a first path of light onto the projection plane with the image reproduced to a magnified scale on the projection plane, (c) beam re-directing means located in the first path of light and operative to re-direct the information-carrying beam into a second path of light deflected from and shorter than the first path of light, (d) focussed state detecting means located in the second path of light and operative to detect the location at which the information-carrying beam passed through the projection lens and re-directed to travel along the second path of light is to be focussed by the projection lens, the detecting means being further operative to produce a focus signal having a state dependent on the location, (e) an image reducing lens located in the second path of light between the beam re-directing means and the detecting means for projecting the information-carrying beam onto the detecting means with the image reduced in scale, and (f) adjusting means operatively connected to the projection lens and responsive to the signal from the detecting means for driving the projection lens for movement with respect to each of the image record medium, the projection plane and the image reducing lens in a direction substantially parallel with the first path of light.

In accordance with still another outstanding aspect of the present invention, there is provided an automatically focussed optical apparatus comprising (a) means for producing an information-carrying beam of light carrying information representative of a visible image recorded on an image record medium, (b) an image projection plane onto which the information-carrying beam is to be projected for display, (c) a first lens for forming a first path of light extending to the image projection plane, the first lens being movable along the first path of light with respect to the image record medium and to the image projection plane, (d) beam re-directing means located in the first path of light and operative to re-direct the information-carrying beam into a second path of light deflected from and shorter than the first path of light, (e) focussed state detecting means located in the second path of light and operative to detect the location at which the information-carrying beam passed through the first lens and re-directed to travel along the second path of light is to be focussed by the first lens, the detecting means being further operative to produce a focus signal having a state dependent on the location, (f) a second lens located in the second path of light between the beam re-directing means and the detecting means for projecting the information-carrying beam onto the detecting means with the image reduced in scale, and (g) adjusting means operatively connected to the first lens and responsive to the signal from the detecting means for driving the first lens for movement with respect to each of the image record medium, the image projection plane and the second lens in a direction substantially parallel with the first path of light.

In an apparatus according to the present invention, the beam re-directing means is preferably fixedly located in the first path of light. Furthermore, an apparatus according to the present invention may further comprise means for driving the beam re-directing means between a first angular position allowing the information-carrying beam to advance along the first path of light toward the image projection plane and a second angular position allowing the information-carrying beam to advance along the second path of light toward the second lens.

BRIEF DESCRIPTION OF THE DRAWINGS

The features and advantages of a magnified image projector apparatus according to the present invention will be more clearly appreciated from the following description taken in conjunction with the accompanying drawings in which:

FIG. 4A is a schematic diagram showing how the image to be viewed is reproduced as a reduced image focussed at the photodetector unit of the apparatus illustrated in FIG. 1 or FIG. 2 when the image information carrying beam is directed to travel along another path of light;

DESCRIPTION OF THE PREFERRED EMBODIMENT

Figure 1:
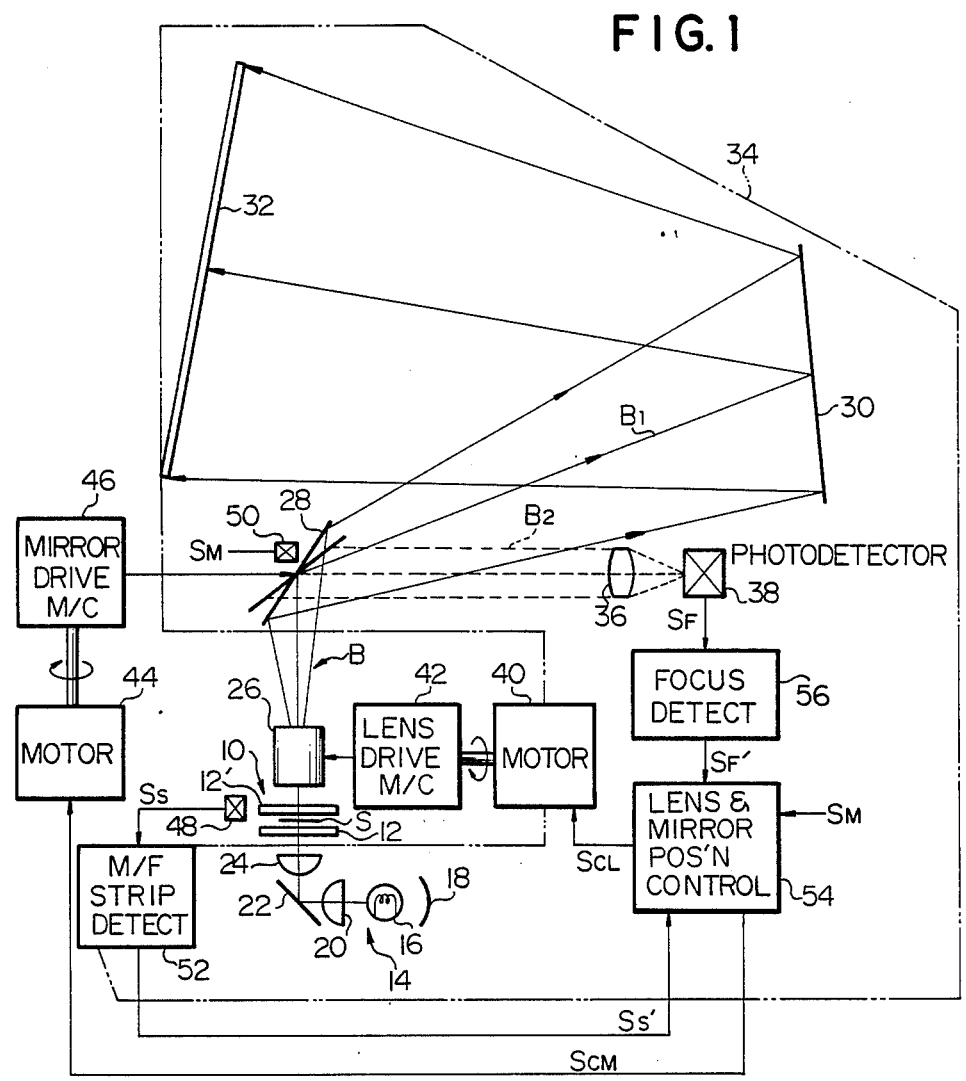
FIG. 1 is a schematic view showing part of the general mechanical, optical and control arrangements of a magnified image projector apparatus embodying the present invention, the optical arrangement being illustrated in side elevation.

FIG. 1 shows the mechanical and optical arrangement of a microfilm reader apparatus which implements a magnified image projector apparatus embodying the present invention and which may form part of a microfilm reader-printer system. The microfilm reader apparatus herein shown is per se well known in the art and comprises a film strip carrier assembly 10 including a pair of transparent microfilm strip holder plates 12 and 12' which are spaced apart in parallel from each other. A microfilm strip S carrying a series of image frames along its length passes through the gap thus formed between these microfilm strip holder plates 12 and 12' and extends between a pair of reels which also form part of the film strip carrier assembly 10 though not shown in the drawings. One of these reels acts as a take-up reel to have wound thereon the microfilm strip fed from the other reel which acts as a feed reel, as well known in the art.

On one side of the film strip carrier assembly thus including the microfilm strip holder plates 12 and 12' is provided a light source assembly 14 which comprises an illumination lamp 16 and a concave reflector mirror 18 located in conjunction with the lamp 16. The light emitted from the illumination lamp 16 is collimated by the concave reflector mirror 18 having a optical axis perpendicular to the direction in which the beam of light is to be transmitted through the microfilm strip S. The collimated beam of light thus reflected from the reflector mirror 18 is passed through a condenser lens 20 and is re-directed at an angle of 90 degrees by a plane reflector mirror 22. Past the plane reflector mirror 22 is positioned another condenser lens 24 through which the beam of light reflected from the mirror 20 is directed toward the microfilm strip S between the holder plates 12 and 12'.

The beam of light transmitted through the microfilm strip S and now carrying image information read from any image frame recorded on the microfilm strip S is passed through a cylindrical projection lens 26 to a tiltable reflector mirror 28. As will be described in detail, the cylindrical projection lens 26 is axially movable with respect to the film strip carrier assembly 10 so that the location of the effective focal point of the lens 26 is adjustable. From the reflector mirror 28, the information-carrying beam of light is re-directed to an image projecting reflector mirror 30 and is projected onto a viewing screen 32 positioned at the front end of the housing 34 of the apparatus. The projection lens 26 has a focal distance which is selected so that the location or point at which the beam of light directed toward the viewing screen 32 is to be focussed on the inner or rear face of the screen 32. On the viewing screen 32 is thus reproduced a magnified image of any of the image frames recorded on the microfilm strip S.

The tiltable reflector mirror 28 is pivotally movable about a axis fixed with respect to the housing 34 so that the beam of light B received from the projection lens 26 is directed either to the image projecting reflector mirror 30 or through a focusing lens 36 to a photodetector unit 38. Thus, the reflector mirror 28 is tiltable between a first angular position directing the beam of light B from the projection lens 26 to the image projecting reflector mirror 30 along a first path of light $B_1$ as indicated by full lines and a second angular position directing the beam B to the photodetector unit 38 via the focusing lens 36 along a second path of light $B_2$ as indicated by broken lines. At this photodetector unit 38 is produced a reduced image of any of the image frames recorded on the microfilm strip S.

The arrangement provided by the tiltable reflector mirror 28 for re-directing the beam of light B to travel selectively along one of the first and second paths of light $B_1$ and $B_2$ may be, if desired, substituted by any other form of mirror arrangement. Though not shown in the drawings, such a modified form of mirror arrangement may use an additional reflector mirror provided to be movable into and out of a position to intercept the first path of light $B_1$. Alternatively, there may be provided a half mirror to split the incoming light beam B into two components, one directed toward the image projecting reflector mirror 30 along the first path of light $B_1$ and the other directed toward the photodetector unit 38 along the second path of light $B_2$. In either of these modified forms of mirror arrangement, the tiltable reflector mirror 28 is replaced with a fixed mirror for directing the incoming beam B solely toward the image projecting reflector mirror 30 along the first path of light $B_1$.

Figure 2:
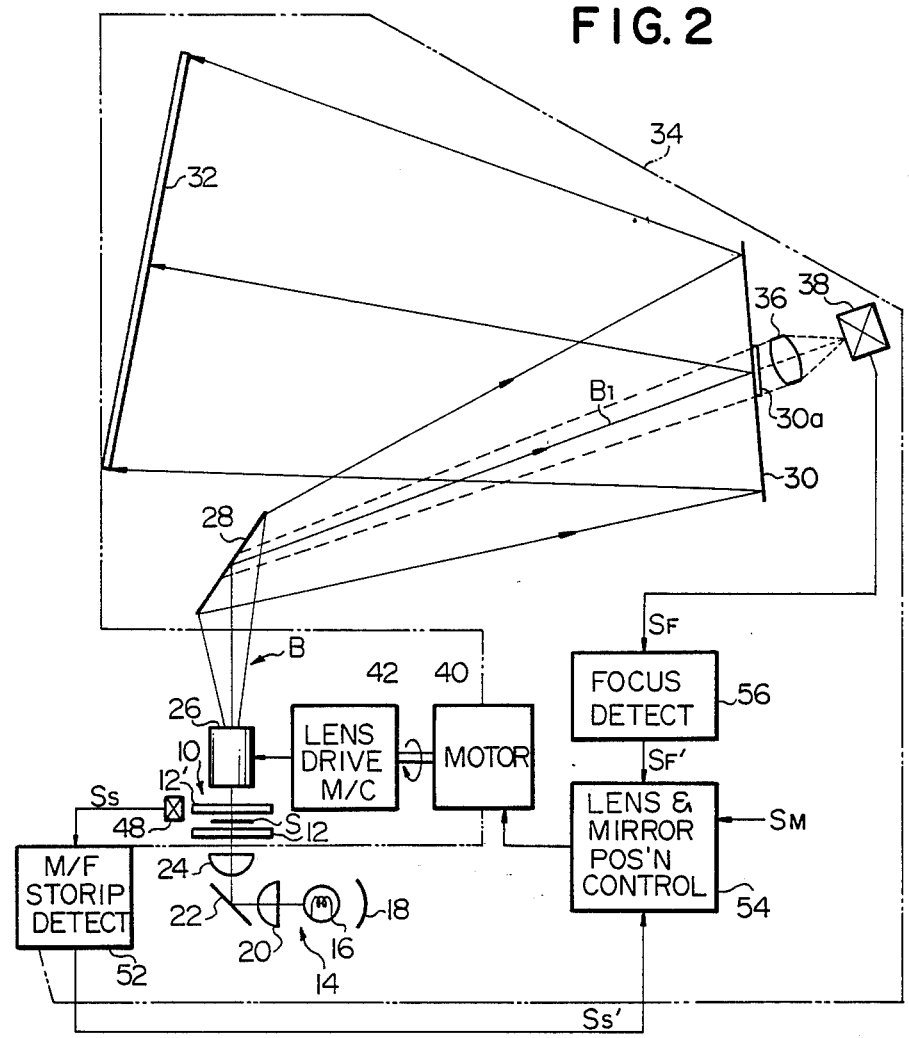
FIG. 2 is a view similar to FIG. 1 but shows a modification of the microfilm reader apparatus illustrated in FIG. 1.

In FIG. 2 is shown the arrangement in which the above mentioned half mirror is provided as a portion 30a of the image projecting reflector mirror 30. In this arrangement, the focusing lens 36 and photodetector unit 38 are located behind such a half mirror portion 30a of the image projecting reflector mirror 30 so that the information-carrying beam of light incident on the reflector mirror 30 by way of the path of light $B_1$ is in part transmitted through the portion 30a of the mirror 30 and is directed toward the focusing lens 36 and photodetector unit 38 as indicated broken lines.

The cylindrical projection lens 26 is axially movable with respect to the film strip carrier assembly 10 including the microfilm strip holder plates 12 and 12' and is operatively connected to a reversible lens drive motor 40 by way of a lens drive mechansim 42. Similarly, the tiltable reflector mirror 28 is operatively connected to a reversible mirror drive motor 44 by way of a mirror drive mechanism 46. These motors 40 and 44 are controlled to operate on the basis of signals including the signals $S_F$ produced by the photodetector unit 38 and signals $S_S$ and $S_M$ produced by a film strip detector 48 and a mirror position detector 50, respectively. The film strip detector 48 is located in conjunction with the film strip carrier assembly 10 such as one of the microfilm strip holder plates 12 and 12' and is operative to produce a signal $S_S$ of one or another logic state responsive to the presence or absence, respectively, of a microfilm strip S between the holder plates 12 and 12'. The signal $S_S$ output from the film strip detector 48 is supplied to a microfilm strip detect circuit 52 and is processed into a signal $S_S'$ indicative of the presence or absence of a microfilm strip S in the film strip carrier assembly 10. The mirror position detector 50 is located in conjunction with the tiltable reflector mirror 28 and is operative to produce a signal $S_M$ of one logic state responsive to the reflector mirror 28 in the first angular position or of another logic state responsive to the reflector mirror 28 in the second angular position thereof. The signal $S_S'$ produced by the microfilm strip detect circuit 52 and the signal $S_M$ produced by the mirror position detector 50 are supplied to a lens/mirror position control circuit 54. The microfilm strip detect circuit 52, lens/mirror position control circuit 54 and focus detect circuit 56 may be in combination implemented by a microprocessor including a central processing unit, a read-only memory and a random-access memory, though not shown in the drawings.

The signals $S_F$ output from the photodetector unit 38 are supplied to a focus detect circuit 56 and is processed into a signal $S_F'$ indicative of whether or not the beam of light incident on the light receiving plane of the unit 38 is correctly focussed at the plane. These signal $S_F'$ is also supplied to the lens/mirror position control circuit 54. The lens/mirror position control circuit 54 is thus responsive to the signals $S_S'$, $S_F'$ and $S_M$ control signals $S_{CL}$ and $S_M$ to control the lens and mirror drive motors 40 and 44, respectively, on the basis of these input signals $S_S'$, $S_F'$ and $S_M$. The lens drive motor 40 is controlled to drive the projection lens 26 for axial movement so that the beam of light emanating from the projection lens 26 is correctly focussed. The mirror drive motor 44 is controlled to drive the tiltable reflector mirror 28 for movement to the first or second angular position thereof.

Figure 3:
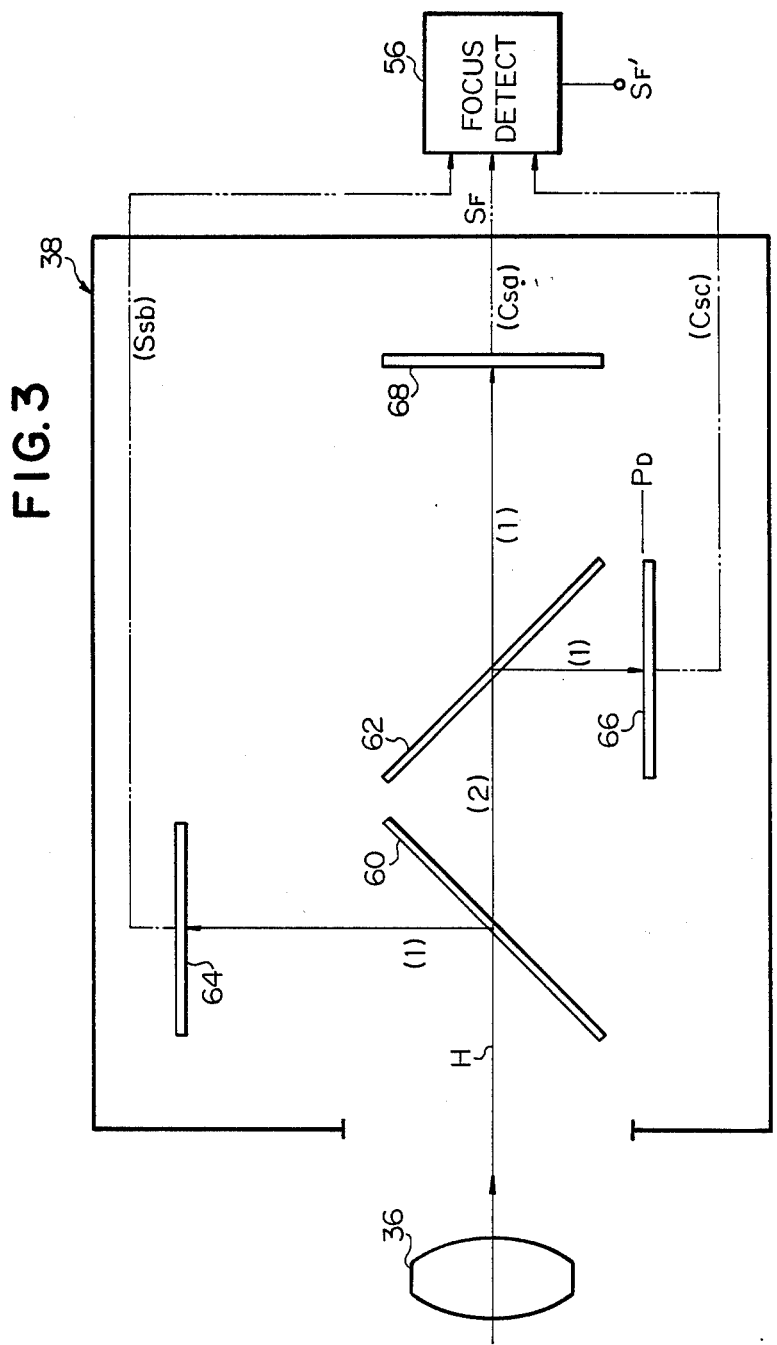
FIG. 3 is a schematic view showing the general construction of the photodetector unit incorporated in the microfilm reader apparatus shown in FIG. 1 or FIG. 2.

The photodetector unit 38 may be implemented by the use of a two-dimensional or linear array of appropriate photoelectric transducer elements such as, for example, photoelectric cells, photoconductive transducers, photodiodes, phototransistors or charge-coupled devices (CCD) arranged to implement a through-the-lens (TTL) configuration. Such a photodetector unit 38 of the through-the-lens configuration may be constructed to allow detection of the contrasts of images to result from the incident beam of light at different locations of the path of light o detection of the phase differences of the incident beam at different locations of the path of light. FIG. 3 shows an example of the photodetector unit 38 which operates through detection of the differences in contrast.

Turning to FIG. 3, the photodetector unit 38 comprises first and second half mirrors 60 and 62 and first, second and third two-dimensional arrays 64, 66 and 68 of charge-coupled devices. The first half mirror 60 is of the type having the transmission-to-reflection ratio of 2:1 and is disposed at 45 degrees to the path of light H of the information-carrying beam travelling from the focusing lens 36. The second half mirror 62 is of the type having the transmission-to-reflection ratio of 1:1 and is also disposed at 45 degrees to the path of light H of the beam from the focusing lens 36. The first array 64 of charge-coupled devices is responsive to the light reflected from the first half mirror 60 and is, in effect, located a predetermined distance $d_1$ ahead of the plane $P_D$ on which the beam of light incident on the photodetector unit 38 is to be found when the beam is correctly focused by the focusing lens 36. The second array 66 of charge-coupled devices is responsive to the light transmitted through the first half mirror 60 and reflected from the second half mirror 62 and is, in effect, located at the plane $P_D$ on which the beam of light incident on the photodetector unit 38 is to be found when correctly focused by the focusing lens 36. The third array 68 of charge-coupled devices is responsive to the light transmitted through the second half mirror 62 and is, in effect, located a predetermined distance $d_2$ behind the plane PD on which the beam of light incident on the photodetector unit 38 is to be found when correctly focused by the focusing lens 36. The effective distance $d_1$ between the first and second arrays 64 and 66 of charge-coupled devices along the light paths to the array 64 and 66 is herein assumed to be equal to the effective distance $d_2$ between the second and third array 66 and 68 of charge-coupled devices along the light paths to the arrays 66 and 68.

The individual charge-coupled devices forming each of the CCD arrays 64, 66 and 66 are arranged in rows and columns and are thus operative to produce signals $S_F$ indicative of the intensities of light at the crossings of such rows and columns when irradiated with the beam of light from any of the half mirrors 60 and 62. Thus, the signals $S_F$ produced from the charge-coupled devices of each CCD array include a signal indicative of the maximum intensity $L_{max}$ and a signal indicative of the minimum intensity $L_{min}$ of the light incident on the CCD array. The charge-coupled devices forming each of the CCD arrays 64, 66 and 66 are electrically connected to the focus detect circuit 56 which receive the signals $S_F$ produced from the charge-coupled devices of each CCD array. From the signals $S_F$ supplied from each of the arrays 64, 66 and 68 of charge-coupled devices, the focus detect circuit 56 determines the maximum and minimum intensities $L_{max}$ and $L_{min}$ of the light incident on each CCD array and calculates from these values the image contrast $C_s$ for each CCD array. This image contrast $C_s$ is given the difference between the maximum and minimum intensities $L_{max}$ and $L_{min}$ of light, hence $$C_s = L_{max} - L_{min} \qquad \ldots \text{Eq. 1}$$

Figure 7:
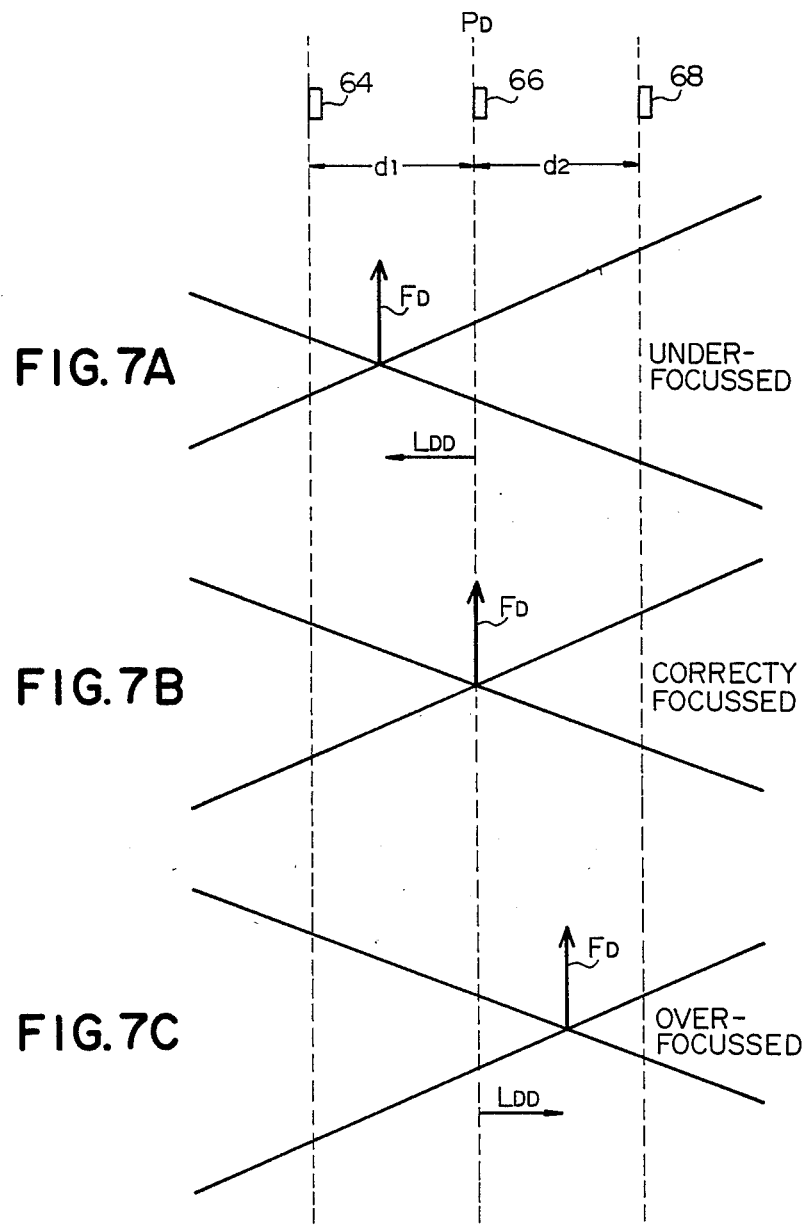
FIGS. 7A, 7B and 7C are diagrams showing different locations at which a beam of light is focussed by the focusing lens incorporated in the apparatus shown in FIG. 1 or FIG. 2 with respect to the plane on which the beam of light incident on the photodetector unit is to be found when the beam is correctly focused.
Figure 8:
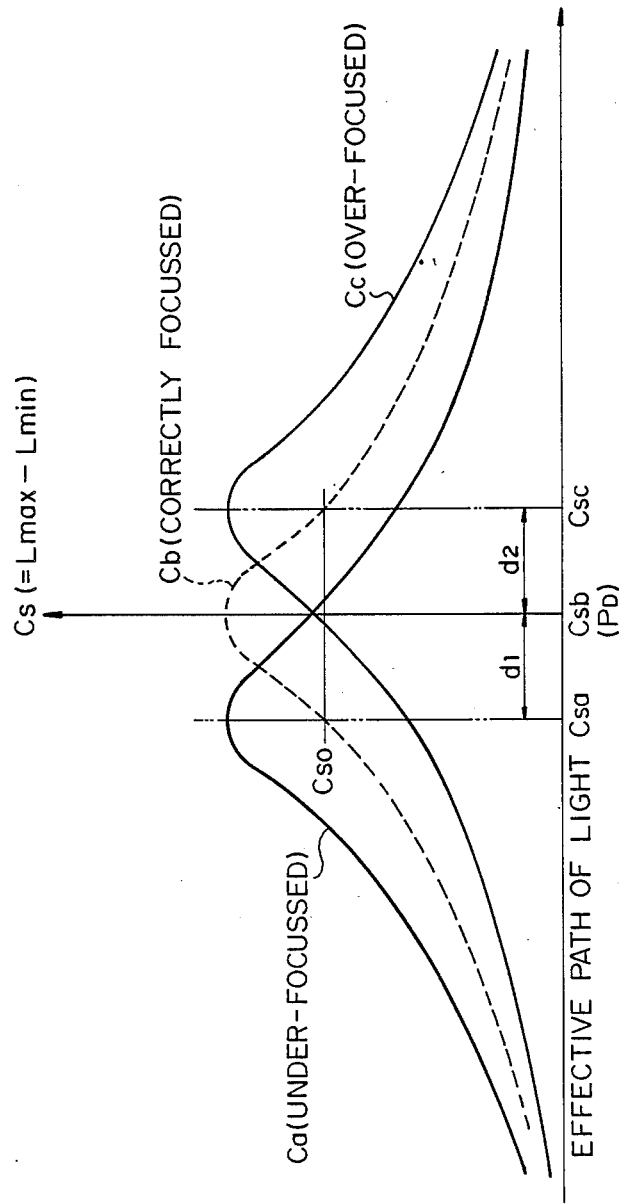
FIG. 8 is a graphic representation of the image contrast determined at various locations with respect to such a plane when the beam of light is under-focussed, correctly focussed and over-focussed.

Image contrasts $C_{sa}$, $C_{sb}$ and $C_{sc}$ are thus determined in respect of the first, second and third CCD arrays 64, 66 and 68, respectively, of the photodetector unit 38. These image contrasts $C_{sa}$, $C_{sb}$ and $C_{sc}$ differ from one another and any one of these must be larger than the others. This largest image contrast $C_{sa}$, $C_{sb}$ or $C_c$ must have resulted from the CCD array 64, 66 or 68 on which the incident beam of light is focussed. If the image contrast $C_{sa}$ determined in respect of the first array 64 of charge-coupled devices is the largest, this means that the incident beam of light is focussed on or in the vicinity of the first CCD array 64 as shown in FIG. 7A. Such a beam of light is "under-focussed" with respect to the plane $P_D$ on which the beam of light incident on the photodetector unit 38 is to be found when correctly focused the focusing lens 36. If the image contrast $C_{sb}$ determined in respect of the second array 66 of charge-coupled devices is the largest, then the incident beam of light must be focussed on or in the vicinity of the second CCD array 66 as shown in FIG. 7B. Such a beam of light is correctly focussed with respect to the plane $P_D$. If the image contrast $C_{sc}$ determined in respect of the third array 68 of charge-coupled devices is the largest, the incident beam of light must be focussed on or in the vicinity of the third CCD array 68 as shown in FIG. 7C. Such a beam of light is "over-focussed" with respect to the plane $P_D$ on which the beam of light incident on the photodetector unit 38 is to be found when correctly focused by the focusing lens 36. FIG. 8 shows the image contrast $C_s$ determined at various locations with respect to the plane $P_D$ when the beam of light is underfocussed (curve Ca), correctly focussed (curve Cb) and over-focussed (curve Cc).

When the beam of light is correctly focussed as shown in FIG. 7B, the image contrast $C_{sb}$ determined in respect of the second CCD array 66 is larger than the image contrasts $C_{sa}$ and $C_{sc}$ determined in respect of the first and third CCD arrays 64 and 66 and the image contrasts $C_{sa}$ and $C_{sc}$ determined in respect of these first and third CCD arrays 64 and 66 are equal to each other ($=C_{so}$) as will be seen from curve Cb. When the beam of light is under-focussed as shown in FIG. 7A, the image contrast $C_{sa}$ determined in respect of the first CCD array 64 is larger than the image contrast $C_{sc}$ determined in respect of the third CCD array 66 as will be seen from curve Ca. When the beam of light is over-focussed as shown in FIG. 7C, the image contrast $C_{sc}$ determined in respect of the third CCD array 68 is larger than the image contrast $C_{sa}$ determined in respect of the first CCD array 64 as will be seen from curve Cc. From the relationship between the image contrasts $C_{sa}$, $C_{sb}$ and $C_{sc}$ determined in respect of the first, second and third CCD arrays 64, 66 and 68, respectively, of the photodetector unit 38, the focus detect circuit 56 detects whether the beam of light incident on the photodetector unit 38 is correctly focussed, under-focussed or over-focussed with respect to the plane $P_D$. Thus, the signal $S_F'$ output from the focus detect circuit 56 may have a first logic state indicating that the incident beam of light under-focussed, a second logic state indicating that the incident beam of light correctly focussed, or a third logic state indicating that the incident beam of light over-focussed with respect to the plane $P_D$. On the basis of the signal $S_F'$ thus supplied from the focus detect circuit 56, the lens/mirror position control circuit 54 may produce a control signal $S_{CL}$ effective to activate the lens drive motor 40 and lens drive mechanism 42 to drive the projection lens 26 for axial movement with respect to the microfilm strip S intervening between the holder plates 12 and 12'.

The image information produced by the photodetector unit 38 may be further utilized for the automatic adjustment and re-adjustment of the positions of the condenser lenses 20 or for the automatic centering of an image frame on the microfilm strip 3 with respect to the optical axis of the projection lens 26. Where the microfilm reader apparatus forms part of a microfilm reader-printer system, the image information produced by the photodetector unit 38 may be also used for the automatic exposure control or automatic margin erasure or for the discrimination between the negative and positive of the image frames of a microfilm strip used in the printer apparatus.

Figure 4:
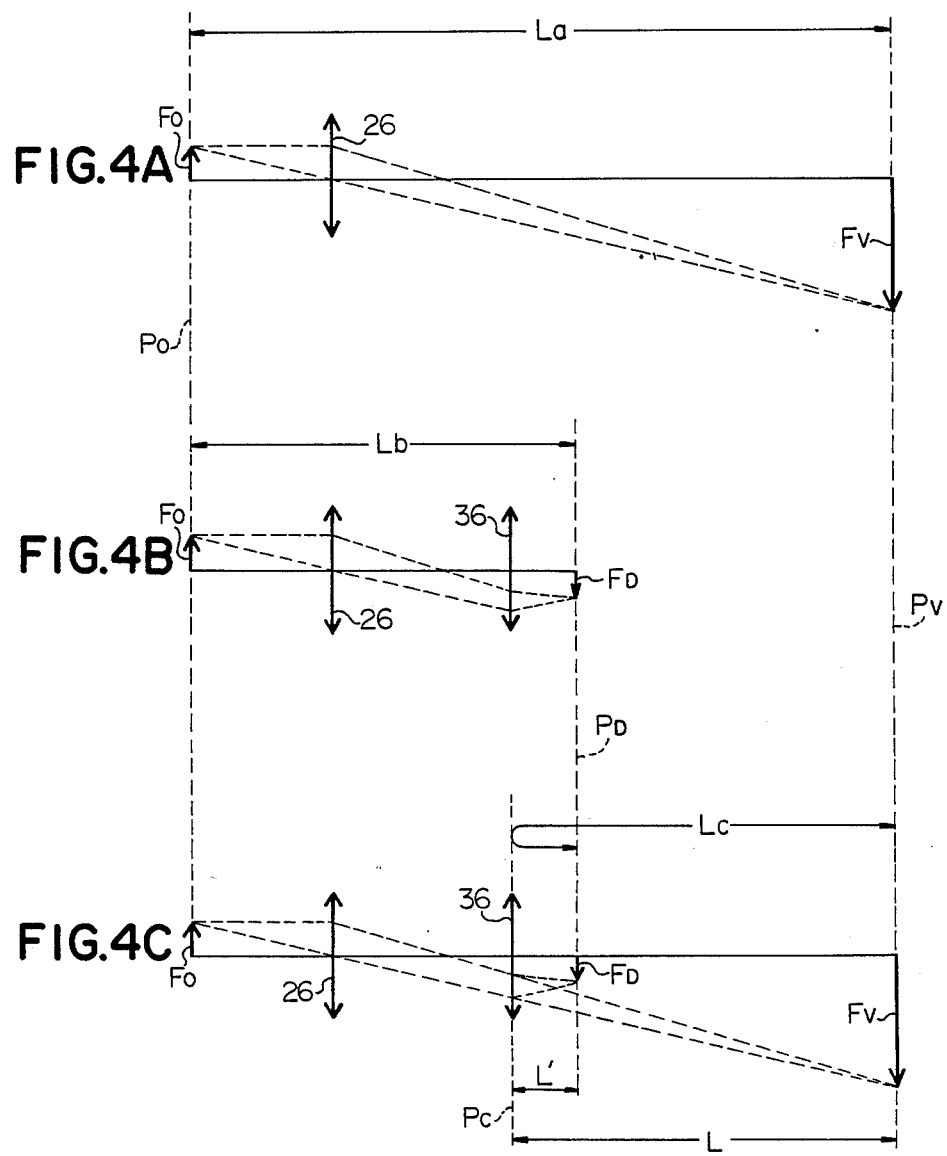
FIG. 4A is a schematic diagram showing how an original image to be viewed is reproduced as a magnified image focussed on the image viewing screen of the apparatus illustrated in FIG. 1 or FIG. 2 when the beam of light carrying the image information is directed to travel along one path of light.
FIG. 4C is an integrated version of the diagrams of FIGS. 4A and 4B.

FIG. 4A shows how an original image frame $F_O$ recorded on the microfilm strip S is reproduced as a magnified image $F_V$ focussed on the image viewing screen 32 when the beam of light carrying the image information is passed through the projection lens 26. FIG. 4B likewise shows how the image frame $F_O$ is reproduced as a reduced image $F_D$ focussed at the photodetector unit 38 when the beam of light carrying the image information passed through the projection lens 26 and focusing lens 36. For convenience sake, the cylindrical projection lens 26 as well as the focusing lens 36 is herein assumed to be an equivalent biconvex lens. FIG. 4C has resulted from the combination of the diagrams of FIGS. 4A and 4B. Denoted by La in FIG. 4A is the distance which the beam of light travels through the projection lens 26 and reflector mirrors 28 and 30 from the original object plane $P_O$ defined by the original image frame $F_O$ to the plane $P_V$ on which the image $F_V$ is to be focussed by the projection lens 26. Denoted by Lb in FIG. 4B is the distance which the beam of light travels through the lens 26, reflector mirror 28 and lens 36 from the original object plane $P_O$ to the plane $P_D$ on which the image $F_D$ is to be focussed by the focusing lens 36. As will be seen from FIG. 4C, the image $F_D$ focussed on the plane $P_D$ by the focusing lens 36 may be considered to have resulted from an object located at the plane $P_V$ on which the image $F_V$ is to be focussed by the projection lens 26. The plane $P_V$ on which the image $F_V$ is to be focussed by the projection lens 26 can thus be regarded as being coincident with the imaginary object plane for the focusing lens 36. Denoted by Lc in FIG. 4C is the distance which a beam of light may travel from the plane $P_V$ on which the image $F_V$ is to be focussed by the projection lens 26 to the plane $P_D$ on which the image $F_D$ is to be focussed by the focusing lens 36.

Considering the distance L from such an imaginary object plane $P_V$ for the focusing lens 36 to the center plane $P_C$ of the lens 36 and the distance L' from the plane $P_D$ on which the image $F_D$ is to be focussed by the focusing lens 36 to the center plane $P_C$ of the lens 36, the magnification factor M of the focusing lens 36 is given from the relation:

$$1/M = L/L',$$

where M is larger than unity. This relationship suggests that the optical parameters of the focusing lens 36, particularly the magnification factor and focal distance of the lens 36, are dependent merely on the location of the imaginary object plane $P_V$ with respect to the center plane $P_C$ of the lens 36 and the location of the plane $P_D$ on which the image $F_D$ is to be focussed by the focusing lens 36. The focusing lens 36 to be used can be for this reason selected without respect to the optical parameters of the projection lens 26.

Figure 6:
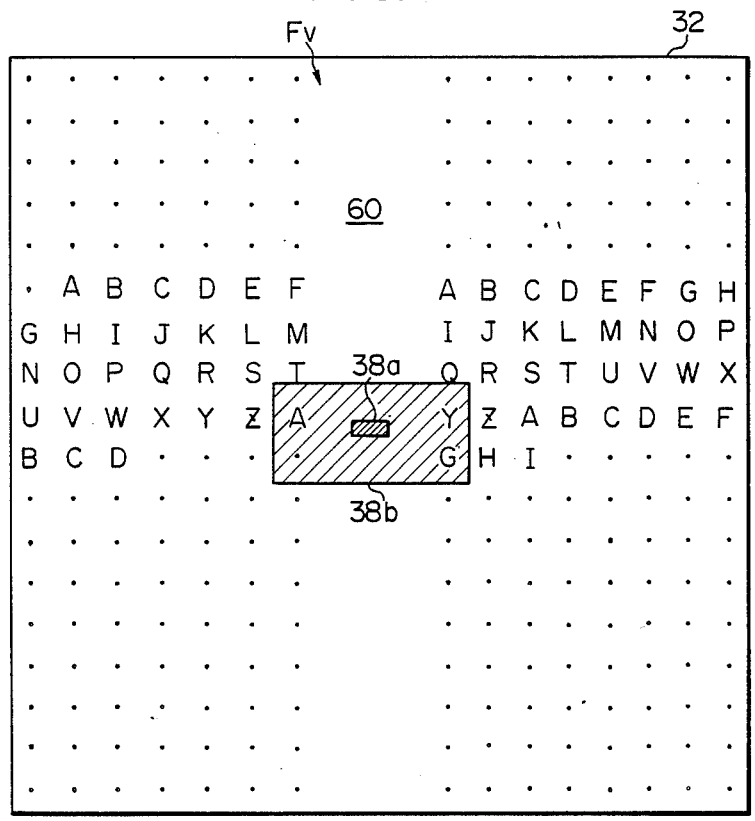
FIG. 6 is a plan view showing an example of the arrangement of the image elements forming the image reproduced on the image viewing screen of the apparatus illustrated in FIG. 1 or FIG. 2 from an image frame recorded on the mm.

Assume now that the image frame $F_O$ is located improperly with respect to the correct object plane $P_O$ to be defined by the original image frame $F_O$ and is thus found on an incorrect object plane $P_O'$ deviated a distance $L_{DO}$ from the correct original object plane $P_O$ toward the projection lens 26 as shown in FIG. 6. In such an occasion, the image $F_V$ focussed by the projection lens 26 will be located on a plane $P_V'$ deviated a distance $L_{DD}$ from the plane $P_V$ on which the image $F_V$ correctly focussed by the lens 26 is to be found. On the other hand, the image $F_D$ focussed by the focusing lens 36 will be located on a plane $P_D'$ deviated a distance $L_{DV}$ from the plane $P_V$ on which the image $F_D$ correctly focussed by the lens 36 is to be found. Assuming that the projection lens 26 has a magnification factor m, the distances of deviation $L_{DV}$ and $L_{DD}$ of the planes $P_V'$ and $P_D'$, respectively, can be approximated by the equations $$L_{DV} = m^2 \cdot L_{DO} = a \cdot L_{DO} \qquad \ldots \text{Eqs. 2}$$

where $a = m^2$ and m is larger than unity, and $$L_{DD} = (1/M)^2 \cdot L_{DV} \qquad \ldots \text{Eq. 3}$$

Substitution of Eq. 1 into Eq. 2 gives $$L_{DV} = (m/M)^2 \cdot L_{DO} = a(1/M)^2 \cdot L_{DO} \qquad \ldots \text{Eqs. 4}$$

Furthermore, Eqs. 2 and 4 can be re-written as $$L_{DO} = (1/a) \cdot L_{DV} \ldots \text{Eq. 5}$$

$$L_{DO} = (M^2/a) \cdot L_{DD} \ldots \text{Eq. 6}$$

Assume further that here are two lens and detector arrangements, viz., the arrangement in which the photodetector unit 38 is located to have a light receiving plane coincident with the plane $P_V$ on which the image $F_V$ is to be focussed by the projection lens 26 and the arrangement having the photodetector unit 38 located to have a light receiving plane coincident with the plane $P_D$ on which the image $F_D$ is to be focussed by the focusing lens 36. Comparison between Eqs. 5 and 6 shows that the former arrangement is capable of taking up the distance of deviation $D_{DO}$ which is $M^2$ times larger than the distance of deviation $D_{DO}$ that could be coped with by the latter arrangement. In the meantime, the relationship of Eqs. 2 which show that the distance of deviation $D_{DO}$ of the object plane $P_O$ defined by the original image frame $F_O$ results in the distance of deviation $m^2 \cdot D_{DO}$ of the image $F_V$ focussed by the projection lens 26. This means that the focal point produced in the apparatus embodying the present invention can be detected accurately for a considerably large range of the distance of deviation $D_{DO}$. Such an allowable range of the distance of deviation $D_{DO}$ is multiplied by the value $M^2$ in the arrangement in which the photodetector unit 38 is located to have a light receiving plane coincident with the plane $P_V$ on which the image $F_V$ is to be focussed by the projection lens 26.

FIG. 6 shows an example of the arrangement of the image elements forming the image $F_V$ reproduced on the image viewing screen 32 from an image frame $F_O$ recorded on the microfilm strip S. As will be seen from this FIG. 6, the image $F_V$ frequently has a blank central area 60 having no image information and dividing the image $F_V$ into two image areas. If the photodetector unit 38 is designed to have a light receiving plane located to correspond to a portion of such a blank central area 60 as indicated at 38a, the photodetector unit 38 could not be responsive to the image elements of the image $F_V$ on the viewing screen 32 without the 36 provided in combination with the photodetector unit 38. In order to enable the photodetector unit 38 per se to be responsive to the image elements of the image $F_V$, it is required that the photodetector unit 38 be designed to have a wider or more spacious light receiving plane covering portion of the image areas of the image $F_V$ as indicated at 38b. By virtue of the focusing lens 36 provided in combination with the photodetector unit 38 in the embodiment of the present invention, the actual area of the light receiving area plane 38a of the photoconductor unit 38 located on the plane $P_V$ on which the image $F_V$ is to be focussed by the projection lens 26 is multiplied by the value $M^2$. Thus, the light receiving plane of the photoconductor unit 38 used with the focusing lens 36 may have an effective area equivalent to the enlarged light receiving plane 38b of the photodetector unit 38 as shown in FIG. 6. Considering, in addition, that the spacing between the successive image frames of a microfilm strip S is sufficiently wide as compared to such an effective area of the light receiving plane of the photodetector unit 38, this advantage achievable through the provision of the focusing lens 36 may be achieved substantially without respect to the location of the photodetector unit 38 within an area corresponding to the whole area of the image viewing screen 32. This means that the focal point of the information-carrying beam incident on the photodetector unit 38 can be detected accurately if the photodetector unit has a significantly reduced light receiving area.

Figure 5:
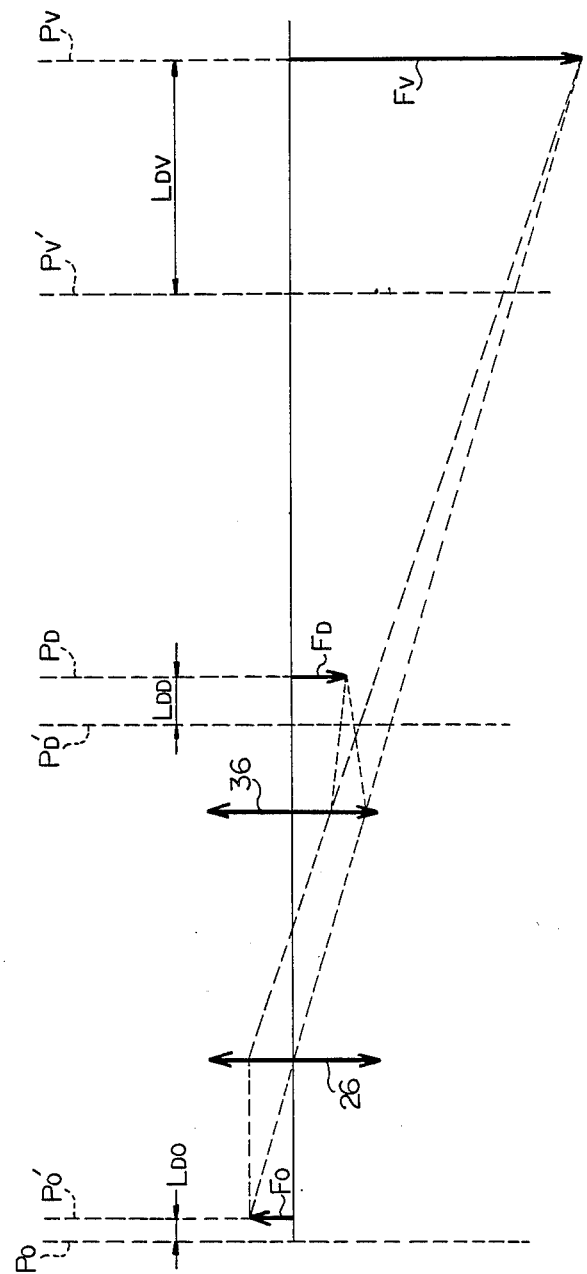
FIG. 5 is a diagram similar to FIG. 4C but shows how the original image to be viewed is reproduced as the image focussed on the image viewing screen or at the photodetector unit of the apparatus illustrated in FIG. 1 when the image to be viewed is located on a plane deviated from a correct object plane on which the image to be viewed is located.

In the embodiment of the present invention, the projection lens 26 may be selected to have a magnification factor m of 12. If, in this instance, the image frame $F_O$ on the microfilm strip S is found on an object plane $P_O'$ deviated a distance $L_{DO}$ of 0.1 mm from the correct original object plane $P_O$ toward the projection lens 26 as shown in FIG. 5. In such an occasion, the image $F_V$ focussed by the projection lens 26 will be located on a plane $P_V'$ deviated a distance $L_{DD}$ of 57.8 mm ($=0.1 \times 24^2$) from the plane $P_V$ on which the image $F_V$ correctly focussed by the lens 26 is to be found. This means that the deviation of the object plane $F_O$ through the distance of plus or minus 0.1 mm could be coped with by a photodetector unit capable of responding to deviation of the plane $P_V$ through the distance of plus or minus 57.8 mm. On the other hand, the focusing lens 36 may be selected to have a magnification factor M of 1/15. In this instance, the image $F_D$ focussed by the focusing lens 36 will be located on a plane $P_D'$ deviated a distance $L_{DV}$ of 0.256 mm ($=57.8 \times (1/15)^2$) from the plane $P_V$ on which the image $F_D$ correctly focussed by the lens 36 is to be found. This now means that the deviation of the object plane $F_O$ through the distance of plus or minus 0.1 mm can be coped with by the photodetector unit 38 in the apparatus embodying the present invention if the photodetector unit 38 is capable of responding to deviation of the plane $P_V$ through the distance of only plus or minus 0.256 mm.

Figure 9:
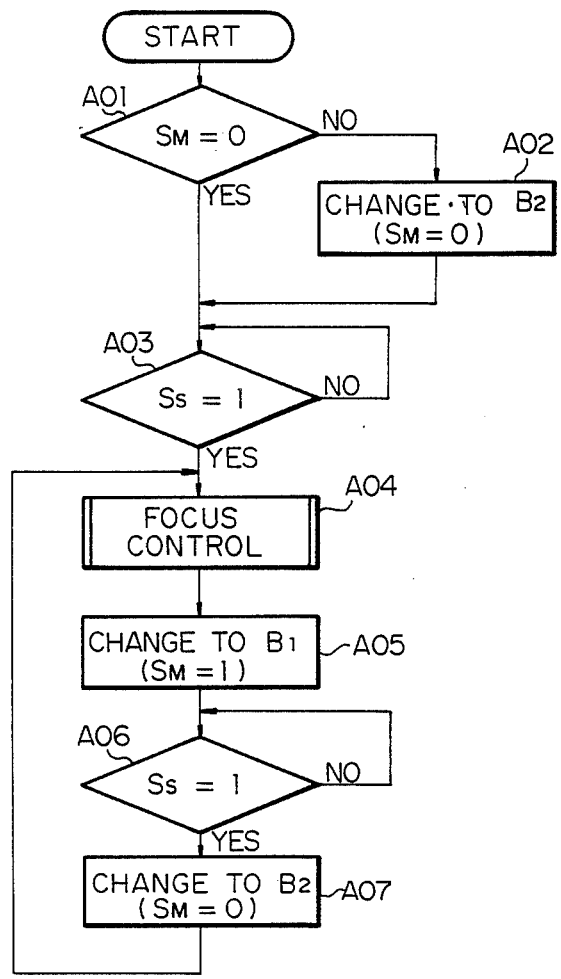
FIG. 9 is a flowchart showing an example of the main routine program which may be executed in the magnified image projector apparatus embodying the present invention.

The features and advantages of a magnified image projector apparatus according to the present invention will be understood more specifically from the following description regarding the operation of such an apparatus. FIG. 9 shows a flowchart showing the main routine program which may be executed by the combination of the microfilm strip detect circuit 52, lens/mirror position control circuit 54 and focus detect circuit 56.

When the apparatus shown in FIG. 1 or FIG. 2 is switched in, the illumination lamp 16 of the light source assembly 14 is activated to glow so that a collimated light travelling through the condenser lens 14, reflector mirror 22 and condenser lens 24 passes through the transparent microfilm strip holder plates 12 and 12' of the film strip carrier assembly 10. The routine program illustrated in FIG. 9 is then started with a decision step A01 to check whether or not the signal $S_M$ produced by the mirror position detector 50 associated with the tiltable reflector mirror 28 is of a logic "0" state indicating that the reflector mirror 28 is held in the second angular position directing the beam of light B from the projection lens 26 to the focusing lens 36 along the second path of light $B_2$. If it is found at this step A01 that the signal $S_M$ from the mirror position detector 50 is of a logic "1" state indicating that the reflector mirror 28 is held in the first angular position thereof, the step A01 is followed by a step A02 at which the lens/mirror position control circuit 54 outputs a control signal $S_{CM}$ effective to activate the mirror drive motor 44 and mirror drive mechanism 46 to drive the mirror 28 to turn from the first angular position t the second angular position thereof.

Subsequently to step A02 or when it is found at the step A01 that the signal $S_M$ from the mirror position detector 50 is of logic "0" state, the routine program proceeds to step A03 to check whether or not the signal $S_S$ produced by the film strip detector 48 associated with one of the microfilm strip holder plates 12 and 12' of the film strip carrier assembly 10 is of a logic "1" state indicating that there is a microfilm strip S intervening between the holder plates 12 and 12'. If it is found at this step A03 that the signal $S_S$ from the film strip detector 48 is not of the logic "1" state, the apparatus waits until the answer for the step A03 turns affirmative. When a microfilm strip S is inserted between the holder plates 12 and 12' so that it is found at the step A03 that the signal $S_S$ from the film strip detector 48 is of the logic "1" state, the microfilm strip detect circuit 52 supplies to the lens/mirror control circuit 54 a signal $S_S'$ indicating that the apparatus is ready for operation. An image frame of the microfilm strip S intervening between the holder plates 12 and 12' is now illuminated with the light passing through the holder plates 12 and 12' and the resultant information-carrying beam is directed from the projection lens 26 to the reflector mirror 28 and past the mirror 28 and further through the focusing lens 36 to the photodetector unit 38.

The step A03 is followed by a focus detect subroutine program A04 by which the focus detect circuit 56 produces, responsive to the signals $S_F$ supplied from the photodetector unit 38, the signal $S_F'$ indicating that the light incident on the photodetector unit 38 is correctly focussed, underfocussed or over-focussed with respect to the plane $P_D$. If the signal $S_F'$ indicates that the light incident on the photodetector unit 38 is under-focussed or over-focussed with respect to the plane $P_D$, the lens/mirror position control circuit 54 responsive to this signal $S_F'$ produces a control signal $S_{CL}$ effective to activate the lens drive motor 40 and lens drive mechanism 42 to drive the projection lens 26 for axial movement away from or toward the microfilm strip S intervening between the holder plates 12 and 12' until the light incident on the photodetector unit 38 is correctly focussed with respect to the plane $P_D$. The details of the automatic focus control subroutine program A04 will be hereinafter described with reference to FIG. 10.

The subroutine program A04 is followed by a step A05 at which the lens/mirror position control circuit 54 outputs a control signal $S_{CM}$ effective to activate the mirror drive motor 44 and mirror drive mechanism 46 to drive the mirror 28 to turn from the second angular position to the first angular position thereof. The reflector mirror 28 is no held in the first angular position directing the beam of light B from the projection lens 26 to the image projecting reflector mirror 30 along the first path of light $B_1$. The image $F_V$ resulting from the original image $F_O$ read from the image frame of the microfilm strip S currently located in the film strip carrier assembly 10 is thus reproduced on the image viewing screen 32 which has the inner face coincident with the plane $P_V$ on which the image $F_V$ is to be focussed by the projection lens 26.

Subsequently to step A05, the routine program proceeds to step A06 to check whether or not the signal $S_S$ produced by the film strip detector 48 associated with one of the microfilm strip holder plates 12 and 12' of the film strip carrier assembly 10 is of a logic "1" state indicating that there is another image frame of the microfilm strip S intervening between the holder plates 12 and 12'. If it is found at this step A06 that the signal $S_S$ from the film strip detector 48 is not of the logic "1" state, the apparatus waits until the answer for the step A06 turns affirmative. When a new image frame of the microfilm strip S is located between the holder plates 12 and 12' so that it is found at the step A06 that the signal $S_S$ from the film strip detector 48 is of the logic "1" state, the step A06 is followed by a step A07 at which the lens/mirror position control circuit 54 further outputs a control signal $S_{CM}$ effective to activate the mirror drive motor 44 and mirror drive mechanism 46 to drive the mirror 28 to turn from the first angular position back to the second angular position directing the beam of light B from the projection lens 26 to the focusing lens 36 along the second path of light $B_2$. The routine program then reverts to the focus control subrouting program A04 and repeats the subroutine program A04 and steps A05 and A05 until the apparatus if finally switched off.

Figure 10:
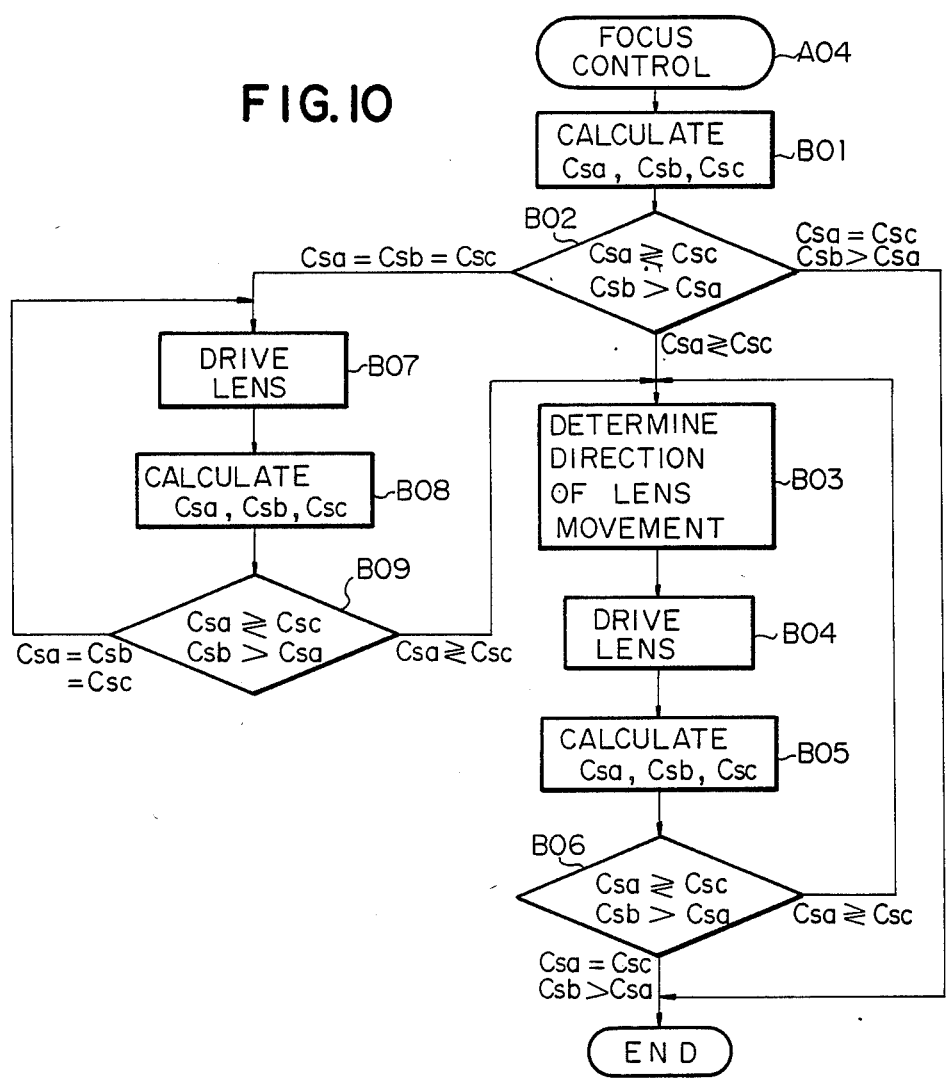
FIG. 10 is a flowchart showing the details of the automatic focus control subroutine program included in the main routine program illustrated in FIG. 9.

Turning to FIG. 10, the automatic focus control subroutine program A04 starts with a step B01 to calculate the contrast $C_s$ of the image to result from the light incident on each of the first, second and third arrays 64, 66 and 68 of charge coupled devices in the photodetector unit 38 shown in FIG. 3. From the signals $S_F$ supplied from each of the arrays 64, 66 and 68 of charge-coupled devices, the focus detect circuit 56 determines the maximum and minimum intensities $L_{max}$ and $L_{min}$ of the light incident on each CCD array and calculates from these values the image contrast $C_s$ for each CCD array in accordance with Eq. 1. The focus detect circuit 56 then calculates the image contrasts $C_{sa}$, $C_{sb}$ and $C_{sc}$ in respect of the first, second and third CCD arrays 64, 66 and 68, respectively, of the photodetector unit 38. These image contrasts $C_{sa}$, $C_{sb}$ and $C_{sc}$ are then compared with one another at a subsequent step B02 to determine if the image contrast $C_{sa}$ calculated in respect of the first CCD array 64 is larger or smaller than the image contrast $C_{sc}$ calculated in respect of the third CCD array 68, and if the image contrast $C_{sb}$ calculated in respect of the second CCD array 66 is larger than the image contrast $C_{sa}$ calculated in respect of the first CCD array 64.

When the image contrast $C_{sa}$ calculated in respect of the first CCD array 64 is found to be neither larger or nor smaller than the image contrast $C_{sc}$ calculated in respect of the third CCD array 68 and the image contrast $C_{sb}$ calculated in respect of the second CCD array 66 found to be larger than the image contrast $C_{sa}$ calculated in respect of the first CCD array 64, it is determined that the image contrast $C_{sa}$ is equal to the image contrast $C_{sc}$ and the image contrast $C_{sb}$ is larger than the image contrast $C_{sa}$. This meaning that the incident light is correctly focussed with respect to the plane $P_D$, the execusion of the subroutine program A04 is terminated and the main routine program illustrated in FIG. 9 is executed continuedly.

If it is found at step B02 that the image contrast $C_{sa}$ calculated in respect of the first CCD array 64 is larger or smaller than the image contrast $C_{sc}$ calculated in respect of the third CCD array 68, it is determined that the incident light is under-focussed or over-focussed with respect to the plane $P_D$. In this occasion, the step B02 is followed by step B03 at which the direction in which the projection lens 26 is to be driven for movement with respect to the microfilm strip S in the film strip carrier assembly 10 is determined depending on whether the image contrast $C_{sa}$ is larger or smaller than the image contrast $C_{sc}$, viz., the incident light is under-focussed or over-focussed with respect to the plane $P_D$. When the direction of movement as required of the projection lens 26 is thus determined, the lens/mirror position control circuit 54 responsive to the signal $S_F'$ supplied from the focus detect circuit 56 produces at step B04 a control signal $S_{CL}$ effective to activate the lens drive motor 40 and lens drive mechanism 42 to drive the projection lens 26 for axial movement toward or away from the microfilm strip S in the film strip carrier assembly 10.

After the projection lens 26 is thus moved with respect to the microfilm strip S, the image contrasts $C_{sa}$, $C_{sb}$ and $C_{sc}$ in respect of the CCD arrays 64, 66 and 68, respectively, of the photodetector unit 38 are calculated for a second time as at step B05. The image contrasts $C_{sa}$, $C_{sb}$ and $C_{sc}$ thus newly determined are compared with one another at a subsequent step B06 to determine if the image contrast $C_{sa}$ in respect of the first CCD array 64 is larger or smaller than the image contrast $C_{sc}$ in respect of the third CCD array 68, and if the image contrast $C_{sb}$ in respect of the second CCD array 66 is larger than the image contrast $C_{sa}$ in respect of the first CCD array 64. When the image contrast $C_{sa}$ is found to be neither larger or nor smaller than the image contrast $C_{sc}$ and the image contrast $C_{sb}$ found to be larger than the image contrast $C_{sa}$, it is determined that the incident light is correctly focussed with respect to the plane $P_D$ so that the execution of the subroutine program A04 is terminated and the main routine program illustrated in FIG. 9 is restored.

If it is found at step B06 that the image contrast $C_{sa}$ is larger or smaller than the image contrast $C_{sc}$, it is determined that the incident light is under-focussed or over-focussed with respect to the plane $P_D$. In this instance, the step B06 is followed by the step B03 and the loop of the steps B03 to B06 is repeated until it is found at the step B06 that the image contrast $C_{sa}$ is neither larger or nor smaller than the image contrast $C_{sc}$ and the image contrast $C_{sb}$ is larger than the image contrast $C_{sa}$.

If it is found at step B02 that the image contrast $C_{sa}$ calculated in respect of the first CCD array 64 is neither larger nor smaller than the image contrast $C_{sc}$ calculated in respect of the third CCD array 68 and that the image contrast $C_{sb}$ calculated in respect of the second CCD array 66 is not larger than the image contrast $C_{sa}$ calculated in respect of the first CCD array 64, the image contrasts $C_{sa}$, $C_{sc}$ and $C_{sc}$ in respect of the first, second and third CCD arrays 64, 66 and 68 must be equal to one another. It is, in this instance, determined that the incident light is focussed on a plane extremely far from the plane $P_D$ on which the image $F_D$ should be focussed by the focusing lens 36. The step B02 is thus followed by step B07 at which the lens/mirror position control circuit 54 responsive to the signal $S_F'$ supplied from the focus detect circuit 56 produces a control signal $S_{CL}$ effective to activate the lens drive motor 40 and lens drive mechanism 42 to drive the projection lens 26 for axial movement toward the microfilm strip S in the film strip carrier assembly 10 over a predetermined distance.

After the projection lens 26 is thus moved toward the microfilm strip S, the image contrasts $C_{sa}$, $C_{sb}$ and $C_{sc}$ in respect of the CCD arrays 64, 66 and 68, respectively, of the photodetector unit 38 are calculated for a second time as at step B08. The newly determined image contrasts $C_{sa}$, $C_{sb}$ and $C_{sc}$ are compared with one another at a subsequent step B09 to determine if the image contrast $C_{sa}$ in respect of the first CCD array 64 is larger or smaller than the image contrast $C_{sc}$ in respect of the third CCD array 68. When the image contrast $C_{sa}$ is found to be neither larger or nor smaller than the image contrast $C_{sc}$ and accordingly the image contrasts $C_{sa}$, $C_{sc}$ and $C_{sc}$ are still equal to one another, the step B09 is followed by the step B07 and the loop of the steps B07 to B09 is repeated until it is found at the step B09 that the image contrast $C_{sa}$ is larger or smaller than the image contrast $C_{sc}$. When the image contrast $C_{sa}$ is thus found to be larger or smaller than the image contrast $C_{sc}$, the step B09 is followed by the step B03 and the loop of the steps B03 to B06 may be repeated until it is found at the step B06 that the image contrast $C_{sa}$ is neither larger or nor smaller than the image contrast $C_{sc}$ and the image contrast $C_{sb}$ is larger than the image contrast $C_{sa}$.

Although only a preferred embodiment is specifically illustrated and described herein, it will be appreciated that many modifications and variations of the present invention are possible in light of the above teachings and within the purview of the appended claims without departing from the spirit and intended scope of the invention.

What is claimed is:

1. A magnified image projector apparatus comprising:

(a) means for retaining in a predetermined position an image record medium having an image recorded thereon, (b) means for producing an information-carrying beam of light carrying information representative of the image on said image record medium, (c) a surface onto which said information-carrying beam is to be projected, said surface being fixed with respect to said predetermined position, (a) a first lens for projecting said information-carrying beam along a first path of light onto said surface with said image reproduced to a magnified scale on said surface, said first lens being movable along said first path of light with respect to said image record medium in said predetermined position and to said surface, (e) beam re-directing means located in said first path of light and operative to re-direct said information-carrying beam into a second path of light reflected from and shorter than said first path of light;

(f) focussed state detecting means locating in said second path of light and operative to detect the location at which the information-carrying beam passed through said first lens and re-directed to travel along said second path of light is to be focussed by the first lens, said detecting means being further operative to produce a focus signal having a state dependent on said location, (g) a second lens located in said second path of light between said beam re-directing means and said detecting means for projecting said information-carrying beam onto said detecting means with said image reduced in scale, (h) adjusting means operatively connected to said first lens and responsive to the signal from said detecting means for driving the first lens for movement with respect to each of the image record medium in said predetermined position, said surface and said second lens in a direction substantially parallel with said first path of light, and (i) means for driving said beam re-directing means between a first angular position allowing said information-carrying beam to advance along said first path of light toward said surface and a second angular position allowing said information-carrying beam to advance along said second path of light toward said second lens.

2. A magnified image projector apparatus as set forth in claim 1, in which said beam re-directing means is fixedly located in said first path of light.

3. A magnified image projector apparatus comprising:

(a) means for retaining in a predetermined position an image record medium having an image recorded thereon, (b) means for producing an information-carrying beam of light carrying information representative of the image on said image record medium, (c) a surface onto which said information-carrying beam is to be projected, said surface being fixed with respect to said predetermined position, (d) a first lens for projecting said information-carrying beam along a first path of light onto said surface with said image reproduced to a magnified scale on said surface, said first lens being movable along said first path of light with respect to said image record medium in said predetermined position and to said surface, (e) beam re-directing means located in said first path of light and operative to re-direct said information-carrying beam into a second path of light deflected from and shorter than said first path of light, (f) focussed state detecting means located in said second path of light and operative to detect the location at which the information-carrying beam passed through said first lens and re-directed to travel along said second path of light is to be focussed by the first lens, said detecting means being further operative to produce a focus signal having a state dependent on said location, said focussed state detecting means comprising (f/1) a plurality of transducer means including first, second and third transducer means, each of said first, second and third transducer means being responsive to said information-carrying beam at a predetermined distance from said beam re-directing means for producing signals including a signal indicative of the maximum intensity of light and a signal indicative of the minimum intensity of light, the predetermined distance of said second transducer means from said beam re-directing means substantially corresponding to the distance of the path of light from said beam-redirecting means to said beam-redirecting means to said surface along said first path of light, the predetermined distance of said first transducer means from said beam re-directing means being shorter than said predetermined distance of said second transducer means from said beam re-directing means, the predetermined distance of said third transducer means from said beam re-directing means being longer than said predetermined distance of said second transducer means from said beam re-directing means, and (f/2) means responsive to the signals from said each of said first, second and third transducer means for producing said focus signal on the basis of signal indicative of the maximum intensity of light and said signal indicative of the minimum intensity of light, said focus signal having a state indicating that the information-carrying beam passed through said first lens is focused at or in the vicinity of a plane defined by one of said first, second and third transducer, (g) a second lens located in said second path of light between said beam re-directing means and said detecting means for projecting said information-carrying beam onto said detecting means with said image reduced in scale, and (h) adjusting means operatively connected to said first lens and responsive to the signal from said detecting means for driving the first lens for movement with respect to each of the image record medium in said predetermined position, said surface and said second lens in a direction substantially parallel with said first path of light.

4. An image projector apparatus for magnifying a visible image recorded on an image record medium and projecting the magnified visible image on a projection plane, comprising:

(a) means for producing an information-carrying beam of light carrying information representative of the image on said image recording medium, (b) a projection lens for projecting said information-carrying carrying beam along a first path of light onto said projection plane with said image reproduced to a magnified scale on said projection plane, (c) beam re-directing means located in said first path of light and operative to re-direct said information-carrying beam into a second path of light deflected from and shorter than said first path of light, (d) focussed state detecting means located in said second path of light and operative to detect the location at which the information-carrying beam passed through said projection lens and re-directed to travel along said second path of light is to be focussed by the projection lens, said detecting means being further operative to produce a focus signal having a state dependent on said location, (e) an image reducing lens located in said second path of light between said beam re-directing means and said detecting means for projecting said information-carrying beam onto said detecting means with said image reduced in scale, (f) adjusting means operatively connected to said projection lens and responsive to the signal from said detecting means for driving the projection lens for movement with respect to each of the image record medium, said projection plane and said image reducing lens in a direction substantially parallel with said first path of light, and (g) means for driving said beam re-directing means between a first angular position allowing said information-carrying beam to advance along said first path of light toward said projection plane and a second angular position allowing said information-carrying beam to advance along said second path of light toward said image reducing lens.

5. A magnified image projector apparatus as set forth in claim 4, in which said beam re-directing means is fixedly located in said first path of light.

6. An image projector apparatus for magnifying a visible image recorded on an image record medium and projecting the magnified visible image on a projection plane, comprising:

(a) means for producing an information-carrying beam of light carrying information representative of the image on said image record medium, (b) a projection lens for projecting said information-carrying beam along a first path of light onto said projection plane with said image reproduced to a magnified scale on said projection plane, (c) beam re-directing means located in said first path of light and operative to re-direct said information-carrying beam into a second path of light deflected from and shorter than said first path of light, (d) focussed state detecting means located in said second path of light and operative to detect the location at which the information-carrying beam passed through said projection lens and re-directed to travel along said second path of light is to be focussed by the projection lens, said detecting means being further operative to produce a focus signal having a state dependent on said location, said focussed state detecting means comprising (d/1) a plurality of transducer means including first, second and third transducer means, each of said first, second and third transducer means being responsive to said information-carrying beam at a predetermined distance from said beam re-directing means for producing signals including a signal indicative of the maximum intensity of light and a signal indicative of the minimum intensity of light, the predetermined distance of said second transducer means from said beam re-directing means substantially corresponding to the distance of the path of light from said beam-redirecting means to said surface along said first path of light, the predetermined distance of said first transducer means from said beam re-directing means being shorter than said predetermined distance of said second transducer means from said beam re-directing means, the predetermined distance of said third transducer means from said beam re-directing means being longer than said predetermined distance of said second transducer means from said beam re-directing means, and (d/2) means responsive to the signals from said each of said first, second and third transducer means for producing said focus signal on the basis of said signal indicative of the maximum intensity of light and said signal indicative of the minimum intensity of light, said focus signal having a state indicating that the information-carrying beam passed through said first lens is focused at or in the vicinity of a plane defined by one of said first, second and third transducer, (e) an image reducing lens located in said second path of light between said beam re-directing means and said detecting means for projecting said information-carrying beam onto said detecting means with said image reduced in scale, and (f) adjusting means operatively connected to said projection lens and responsive to the signal from said detecting means for driving the projection lens for movement with respect to each of the image record medium, said projection plane and said image reducing lens in a direction substantially parallel with said first path of light.

7. An automatically focussed optical apparatus comprising:

(a) means for producing an information-carrying beam of light carrying information representative of a visible image recorded on an image record medium, (b) an image projection plane onto which said information-carrying beam is to be projected, (c) a first lens for forming a first path of light extending to said image projection plane, said first lens being movable along said first path of light with respect to said image record medium and to said image projection plane, (d) beam re-directing means located in said first path of light and operative to re-direct said information-carrying beam into a second path of light deflected from and shorter than said first path of light, (e) focussed state detecting means located in said second path of light and operative to detect the location at which the information-carrying beam passed through said first lens and re-directed to travel along said second path of light is to be focussed by the first lens, said detecting means being further operative to produce a focus signal having a state dependent on said location, (f) a second lens located in said second path of light between said beam re-directing means and said detecting means for projecting said information-carrying beam onto said detecting means with said image reduced in scale, (g) adjusting means operatively connected to said first lens and responsive to the signal from said detecting means for driving the first lens for movement with respect to each of the image record medium, said image projection plane and said second lens in a direction substantially parallel with said first path of light, and (h) drive means for driving said beam re-directing means between a first angular position allowing said information-carrying beam to advance along said first path of light toward said image projection plane and a second angular position allowing said information-carrying beam to advance along said second path of light toward said second lens.

8. A magnified image projector apparatus as set forth in claim 7, in which said beam re-directing means is fixedly located in said first path of light.

9. An image projector apparatus comprising:

(a) means for producing an information-carrying beam of light carrying information representative of a visible image recorded on an image record medium, (b) an image projection plane onto which said information-carrying beam is to be projected, (c) a first lens for forming a first path of light extending to said image projection plane, said first lens being movable along said first path of light with respect to said image record medium and to said image projection plane, (d) beam re-directing means located in said first path of light and operative to re-direct said information-carrying beam into a second path of light deflected from and shorter than said first path of light, (e) focussed state detecting means located in said second path of light and operative to detect the location at which the information-carrying beam passed through said first lens and re-directed to travel along said second path of light is to be focussed by the first lens, said detecting means being further operative to produce a focus signal having a state dependent on said location, said focussed state detecting means comprising (e/1) a plurality of transducer means including first, second and third transducer means, each of said first, second and third transducer means being responsive to said information-carrying beam at a predetermined distance from said beam re-directing means for producing signals including a signal indicative of the maximum intensity of light and a signal indicative of the minimum intensity of light, the predetermined distance of said second transducer means from said beam re-directing means substantially corresponding to the distance of the path of light from said beam-redirecting means to said surface along said first path of light, the predetermined distance of said first transducer means from said beam re-directing means being shorter than said predetermined distance of said second transducer means from said beam re-directing means, the predetermined distance of said third transducer means from said beam re-directing means being longer than said predetermined distance of said second transducer means from said beam re-directing means, and (e/2) means responsive to the signals from said each of said first, second and third transducer means for producing said focus signal on the basis of signal indicative of the maximum intensity of light and said signal indicative of the minimum intensity of light, said focus signal having a state indicating that the information-carrying beam passed the rough said first lens is focused at or in the vicinity of a plane defined by one of said first, second and third transducer, (f) a second lens located in said second path of light between said beam re-directing means and said detecting means for projecting said information-carrying beam onto said detecting means with said image reduced in scale, and (g) adjusting means operatively connected to said first lens and responsive to the signal from said detecting means for driving the first lens for movement with respect to each of the image record medium, said image projection plane and said second lens in a direction substantially parallel with said first path of light.

* * * * *